(12) United States Patent
Zhang

(10) Patent No.: US 9,692,688 B2
(45) Date of Patent: Jun. 27, 2017

(54) DELAY SPECIFIC ROUTINGS FOR PROGRAMMABLE LOGIC DEVICES

(71) Applicant: Lattice Semiconductor Corporation, Hillsboro, OR (US)

(72) Inventor: Qinhai Zhang, San Jose, CA (US)

(73) Assignee: Lattice Semiconductor Corporation, San Jose, CA (US)

( * ) Notice: Subject to any disclaimer, the term of this patent is extended or adjusted under 35 U.S.C. 154(b) by 66 days.

(21) Appl. No.: 14/714,987

(22) Filed: May 18, 2015

(65) Prior Publication Data

US 2016/0344645 A1 Nov. 24, 2016

(51) Int. Cl.
*H04L 12/28* (2006.01)
*H04L 12/703* (2013.01)
*G06F 15/00* (2006.01)

(52) U.S. Cl.
CPC .............. *H04L 45/28* (2013.01); *G06F 15/00* (2013.01); *H04L 12/28* (2013.01)

(58) Field of Classification Search
CPC .. G06F 17/5077; G06F 17/5054; G06F 17/50; G06F 15/00; G11C 2029/5602; H04L 45/28; H04L 12/28
USPC ........................................................ 370/392
See application file for complete search history.

(56) References Cited

U.S. PATENT DOCUMENTS

| | | | | |
|---|---|---|---|---|
| 5,644,500 | A * | 7/1997 | Miura | G06F 17/5077 716/120 |
| 8,069,431 | B1 * | 11/2011 | Zhang | G06F 17/5054 716/128 |
| 2015/0088437 | A1 * | 3/2015 | Lin | G01R 31/2834 702/58 |

OTHER PUBLICATIONS

Vaughn Betz et al., VPR: A New Packaging, Placement and Routing Tool for FPGA Research, 1997 International Workshop on Field Programmable Logic and Applications, Department of Electrical and Computer Engineering, University of Toronto, Toronto, Canada, pp. 1-10.
Jon Frankle, "Iterative and Adaptive Slack Allocation for Performance-driven Layout and FPGA Routing", Xilinx, Inc., 29$^{th}$ ACM/IEEE Design Automation Conference, published 1992, pp. 5369-5542.
Ryan Fung et al., Slack Allocation and Routing to Improve FPGA Timing While Repairing Short-Path Violations, Altera Corporation, Toronto Technology Center, Toronto, Canada, published Mar. 28, 2007, pp. 1-13.
Shi-Zheng Eric Lin et al., "Optimal Time Borrowing Analysis and Timing Budgeting Optimization for Latch-Based Designs", ACM Transactions on Design Automation of Electronic Systems, vol. 7, No. 1, Jan. 2002, pp. 217-230.

(Continued)

*Primary Examiner* — Sai-Ming Chan
(74) *Attorney, Agent, or Firm* — Michael Garrabrants

(57) ABSTRACT

Various techniques are provided to efficiently implement user designs in programmable logic devices (PLDs). In one example, a computer-implemented method includes determining delay windows for connections in a routing of a design for a PLD, identifying invalid connections in the routing based, at least in part, on the determined delay windows, and routing the invalid connections using a dual wave maze routing process to provide a delay-specific routing for the design. The delay-specific routing may be used to generate configuration data to configure physical components of the PLD, and the configuration data may be used to program the PLD to conform to the timing constraints of the design and/or PLD.

20 Claims, 12 Drawing Sheets

(56) References Cited

OTHER PUBLICATIONS

Larry McMurchie et al., "PathFinder: A Negotiation-Based Performance-Driven Router for FPGAs", Department of Computer Science and Engineering, University of Washington, Seattle, 7 pages.
Creative Commons Attribution—Share Alike 3.0, "Static Timing Analysis", published Feb. 12, 2015, [retrieved on May 18, 2015]. Retrieved from the Internet: <URL :http://en.wikipedia.ord/wiki/Static_timing_analysis>.
Joe G. Xi et al., "Useful-Skew Clock Routing with Gate Sizing for Low Power Design", Computer Engineering, University of California, Santa Cruz, $33^{rd}$ Design Automation Conference, Las Vegas, Nevada, published 1996, 6 pages.
Habib Youssef et al., "Timing Constraints for Correct Performance", Computer Science Department, University of Minnesota, published 1990, pp. 24-27.

* cited by examiner

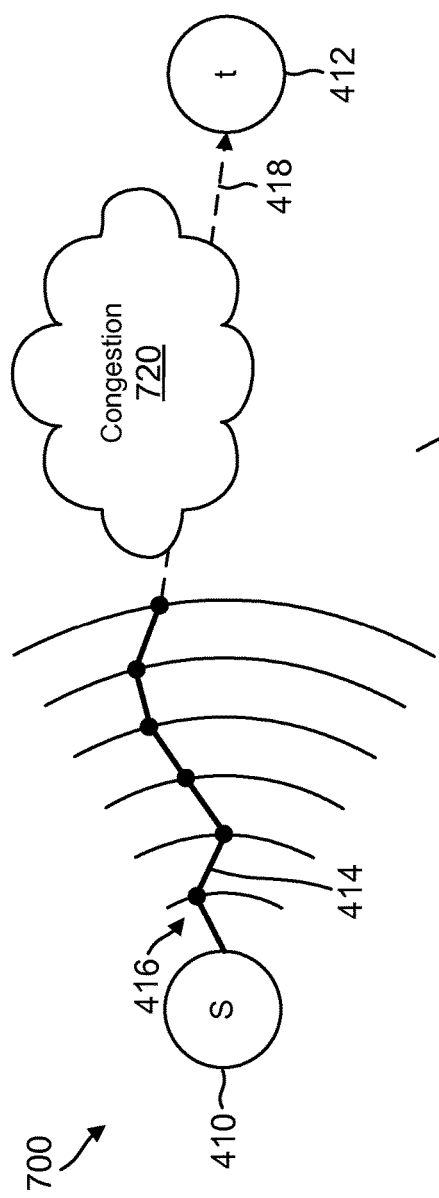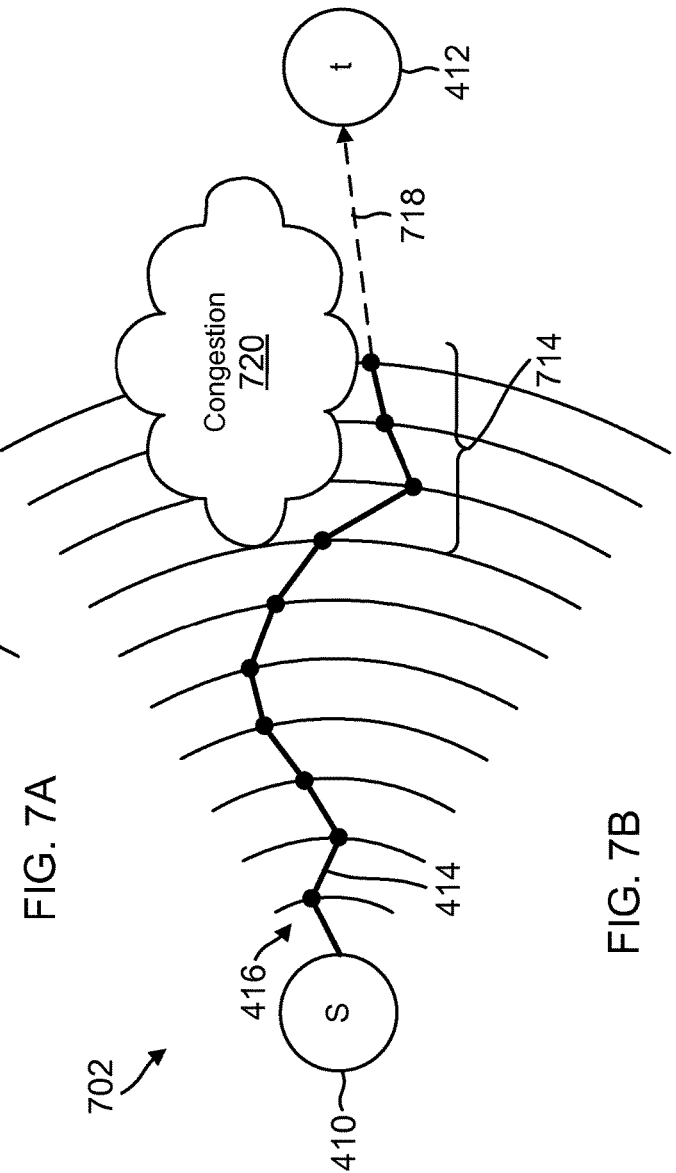

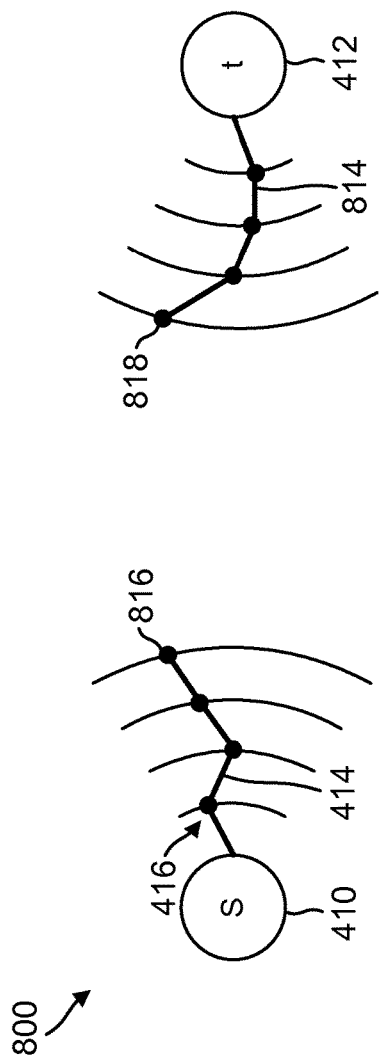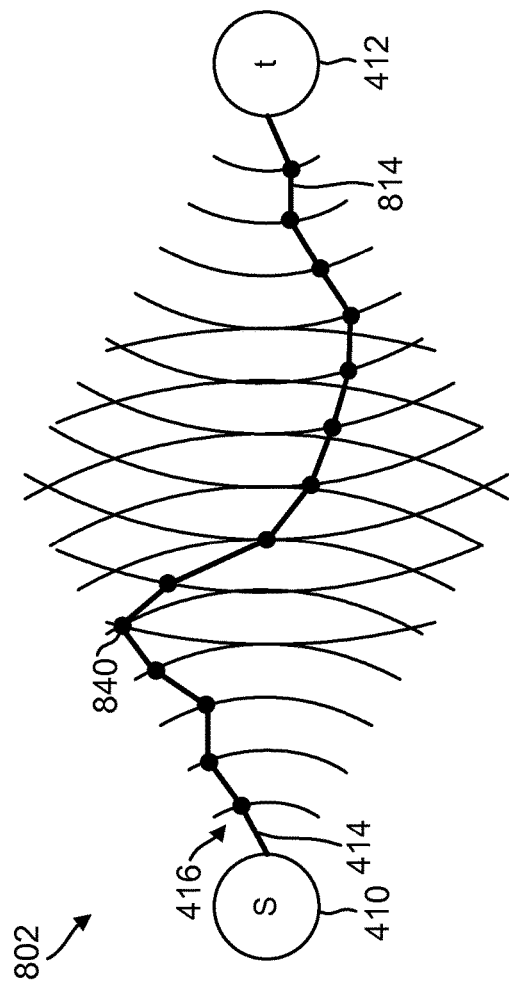

DELAY SPECIFIC ROUTINGS FOR PROGRAMMABLE LOGIC DEVICES

TECHNICAL FIELD

The present invention relates generally to programmable logic devices and, more particularly, to routing signal to components in programmable logic devices.

BACKGROUND

Programmable logic devices (PLDs) (e.g., field programmable gate arrays (FPGAs), complex programmable logic devices (CPLDs), field programmable systems on a chip (FPSCs), or other types of programmable devices) may be configured with various user designs to implement desired functionality. Typically, the user designs are synthesized and mapped into configurable resources (e.g., programmable logic gates, look-up tables (LUTs), embedded hardware, or other types of resources) and interconnections available in particular PLDs. Physical placement and routing for the synthesized and mapped user designs may then be determined to generate configuration data for the particular PLDs.

PLDs typically have a limited supply of routing resources available to provide connections between components of the PLD. This differs from conventional application-specific integrated circuits (ASICs) in which almost any desired signal path may be custom-manufactured for a particular application. Existing approaches to PLD connection routing may fail to route all desired connections or may fail to meet the timing requirements of a particular design. In such cases, ripup and reroute operations are subsequently performed to remove routed connections and attempt to reroute them through alternative routing resources of the PLD. Such operations are inefficient, often result in degraded PLD performance, and significantly increase the time and processing resources needed to determine connection routings for the PLD.

BRIEF DESCRIPTION OF THE DRAWINGS

FIGS. 7A-B illustrate a single wave maze routing process error in accordance with an embodiment of the disclosure.

FIGS. 8A-B illustrate a dual wave maze routing process in accordance with an embodiment of the disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
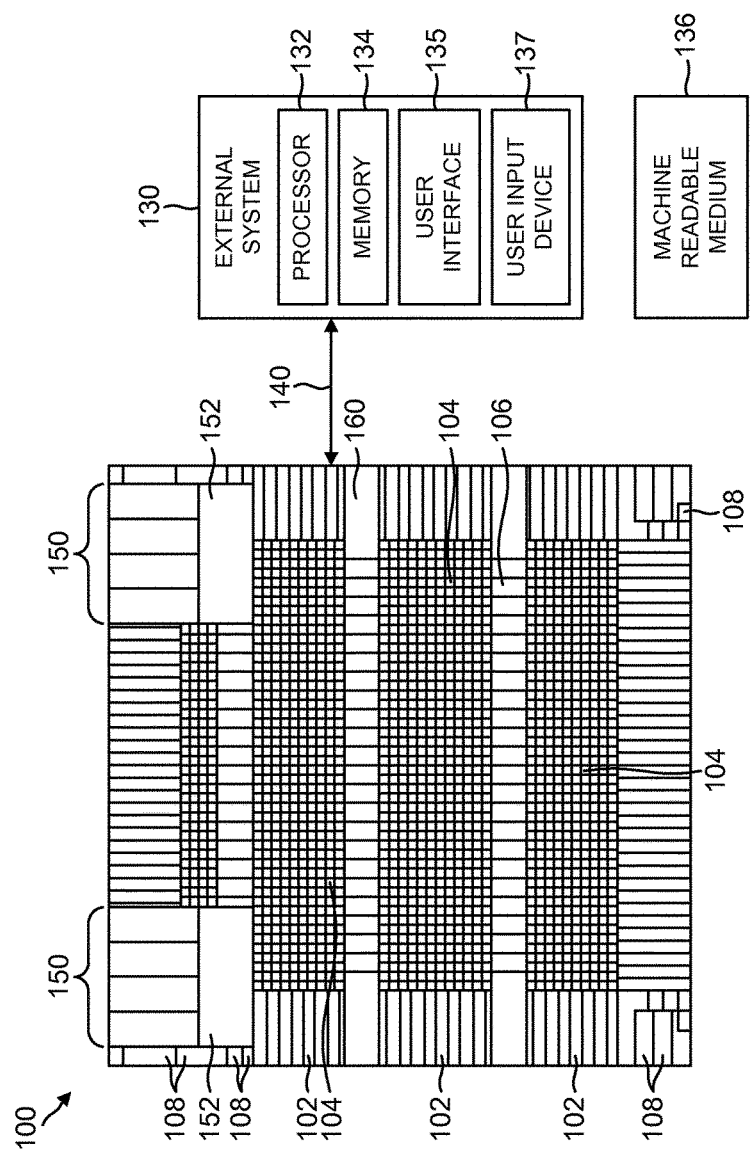
FIG. 1 illustrates a block diagram of a programmable logic device (PLD) in accordance with an embodiment of the disclosure.

In accordance with various embodiments set forth herein, techniques are provided to route connections among components of a programmable logic device (PLD). For example, in some embodiments, a PLD includes a plurality of programmable logic blocks (PLBs), memory blocks, digital signal processing blocks, input/output blocks, and/or other components that may be interconnected in a variety of ways to implement a desired circuit design and/or functionality. A circuit design may be represented, at least in part, by a netlist, which can describe components and connections therebetween in the design. For example, a user design may be converted into and/or represented by a netlist including set of PLD components (e.g., configured for logic, arithmetic, clocking, and/or other hardware functions) and associated interconnections available in a PLD. The netlist may be used to place components and/or route connections for the design (e.g., using routing resources of the PLD) with respect to a particular PLD (e.g., using a simulation of the desired circuit design constructed from the netlist).

In general, a PLD (e.g., an FPGA) fabric includes one or more routing structures and an array of similarly arranged logic cells arranged within programmable function blocks (e.g., PFBs and/or PLBs), all driven by clock signals propagated throughout the PLD. The goal in designing a particular type of PLD is to maximize functionality while minimizing area, power, and delay of the fabric.

Typically, a circuit design for a PLD includes various timing requirements associated with its operation. For example, a particular design may be required to process digital data I/O according to a throughput requirement, which in turn may necessitate particular clock frequencies applied to one or more components of the design. The clock frequencies, coupled with individual I/O requirements and characteristics of the components themselves, can dictate various timing requirements (e.g., required setup/hold times at inputs/outputs and data paths, maximum delay for user-specified signals, maximum skew for clock and bus-like signals, and/or other timing requirements) for each connection between components in the design (e.g., between source and target components/nodes in the design).

These timing requirements may be represented by minimum and maximum timing delay boundaries (e.g., [Dmin, Dmax]) for each connection, which may be referred to as that connection's delay window. Once the delay window for a connection has been determined, that connection may be routed or rerouted (e.g., using routing resources of a PLD) to have an actual timing delay within its delay window (e.g., resulting in a timing error-free design routing, in aggregate), and such routing technique is called delay-specific routing.

Conventional delay-specific routing methods rely on look-ahead functions and/or estimations of the physical path between the source and target components of a connection. These estimation-based techniques are typically insufficiently accurate, particularly as PLD architectures change and circuit designs become more complex, and where the general evolution of PLD design results in stricter timing requirements (e.g., higher clock frequencies, smaller delay windows, and/or other stricter timing requirements), as described herein. Inaccurate estimations of the physical path between source and target components of a connection often result in failed routings, particularly in the context of strict delay window requirements, and failed routings require compute-intensive remedial ripup and reroute operations and/or manual changes to the design.

Embodiments of the present disclosure overcome these problems by removing estimations from the delay-specific routing process. In various embodiments, the estimations are replaced with a relatively efficient calculation of the full physical paths and associated timing delays of connections between source and target components, which can ensure adherence to the appropriate time delay window and search a larger portion of the available routing resources more efficiently than conventional methods. In some embodiments, such processes may increase a chance of finding a timing error-free design routing without substantially increasing the computing resources (e.g., time, memory) needed to complete the routing. As a result of such process (e.g., a timing error-free design routing, as described herein), a user design can be implemented relatively efficiently. Moreover, the overall propagation delay of the resulting design may also be reduced, which in some cases may advantageously permit an increase in the clock frequency of a PLD configured with the design relative to PLDs configured with designs implemented using conventional routing methods.

Referring now to the drawings, FIG. 1 illustrates a block diagram of a PLD 100 in accordance with an embodiment of the disclosure. In various embodiments, PLD 100 may be implemented as a standalone device, for example, or may be embedded within a system on a chip (SOC), other logic devices, and/or other integrated circuit(s). PLD 100 (e.g., a field programmable gate array (FPGA), a complex programmable logic device (CPLD), a field programmable system on a chip (FPSC), or other type of programmable device) generally includes input/output (I/O) blocks 102 and logic blocks 104 (e.g., also referred to as programmable logic blocks (PLBs), programmable functional units (PFUs), or programmable logic cells (PLCs)).

I/O blocks 102 provide I/O functionality (e.g., to support one or more I/O and/or memory interface standards) for PLD 100, while programmable logic blocks 104 provide logic functionality (e.g., look up table (LUT) based logic or logic gate array based logic) for PLD 100. Additional I/O functionality may be provided by serializer/deserializer (SERDES) blocks 150 and physical coding sublayer (PCS) blocks 152. PLD 100 may also include hard intellectual property core (IP) blocks 160 to provide additional functionality (e.g., substantially predetermined functionality provided in hardware which may be configured with less programming than logic blocks 104).

PLD 100 may also include blocks of memory 106 (e.g., blocks of EEPROM, block SRAM, and/or flash memory), clock-related circuitry 108 (e.g., clock driver sources, PLL circuits, DLL circuits, and/or feedline interconnects), and/or various routing resources (e.g., interconnects and appropriate switching logic to provide paths for routing signals throughout PLD 100, such as for clock signals, data signals, or others) as appropriate. In general, the various elements of PLD 100 may be used to perform their intended functions for desired applications, as would be understood by one skilled in the art.

For example, certain I/O blocks 102 may be used for programming memory 106 or transferring information (e.g., various types of user data and/or control signals) to/from PLD 100. Other I/O blocks 102 include a first programming port (which may represent a central processing unit (CPU) port, a peripheral data port, an SPI interface, and/or a sysCONFIG programming port) and/or a second programming port such as a joint test action group (JTAG) port (e.g., by employing standards such as Institute of Electrical and Electronics Engineers (IEEE) 1149.1 or 1532 standards). In various embodiments, I/O blocks 102 may be included to receive configuration data and commands (e.g., over one or more connections 140) to configure PLD 100 for its intended use and to support serial or parallel device configuration and information transfer with SERDES blocks 150, PCS blocks 152, hard IP blocks 160, and/or logic blocks 104 as appropriate.

In another example, routing resources (e.g., routing resources 180 of FIG. 2) may be used to route connections between components, such as between I/O nodes of logic blocks 104. In some embodiments, such routing resources may include programmable elements (e.g., nodes where multiple routing resources intersect) that may be used to selectively form a signal path for a particular connection between components of PLD 100.

It should be understood that the number and placement of the various elements are not limiting and may depend upon the desired application. For example, various elements may not be required for a desired application or design specification (e.g., for the type of programmable device selected).

Furthermore, it should be understood that the elements are illustrated in block form for clarity and that various elements would typically be distributed throughout PLD 100, such as in and between logic blocks 104, hard IP blocks 160, and routing resources (e.g., routing resources 180 of FIG. 2) to perform their conventional functions (e.g., storing configuration data that configures PLD 100 or providing interconnect structure within PLD 100). It should also be understood that the various embodiments disclosed herein are not limited to programmable logic devices, such as PLD 100, and may be applied to various other types of programmable devices, as would be understood by one skilled in the art.

An external system 130 may be used to create a desired user configuration or design of PLD 100 and generate corresponding configuration data to program (e.g., configure) PLD 100. For example, system 130 may store such configuration data to memory 134 and/or machine readable medium 136, and/or provide such configuration data to one or more I/O blocks 102, memory blocks 106, SERDES blocks 150, and/or other portions of PLD 100. As a result, programmable logic blocks 104, various routing resources, and any other appropriate components of PLD 100 may be configured to operate in accordance with user-specified applications.

In the illustrated embodiment, system 130 is implemented as a computer system. In this regard, system 130 includes, for example, one or more processors 132 which may be configured to execute instructions, such as software instructions, provided in one or more memories 134 and/or stored in non-transitory form in one or more non-transitory machine readable mediums 136 (e.g., which may be internal or external to system 130). For example, in some embodiments, system 130 may run PLD configuration software, such as Lattice Diamond System Planner software available from Lattice Semiconductor Corporation to permit a user to create a desired configuration and generate corresponding configuration data to program PLD 100.

System 130 also includes, for example, a user interface 135 (e.g., a screen or display) to display information to a user, and one or more user input devices 137 (e.g., a keyboard, mouse, trackball, touchscreen, and/or other device) to receive user commands or design entry to prepare a desired configuration of PLD 100. In some embodiments, user interface 135 may be adapted to display a netlist, a component placement, a connection routing, hardware description language (HDL) code, and/or other final and/or intermediary representations of a desired circuit design, for example.

Figure 2:
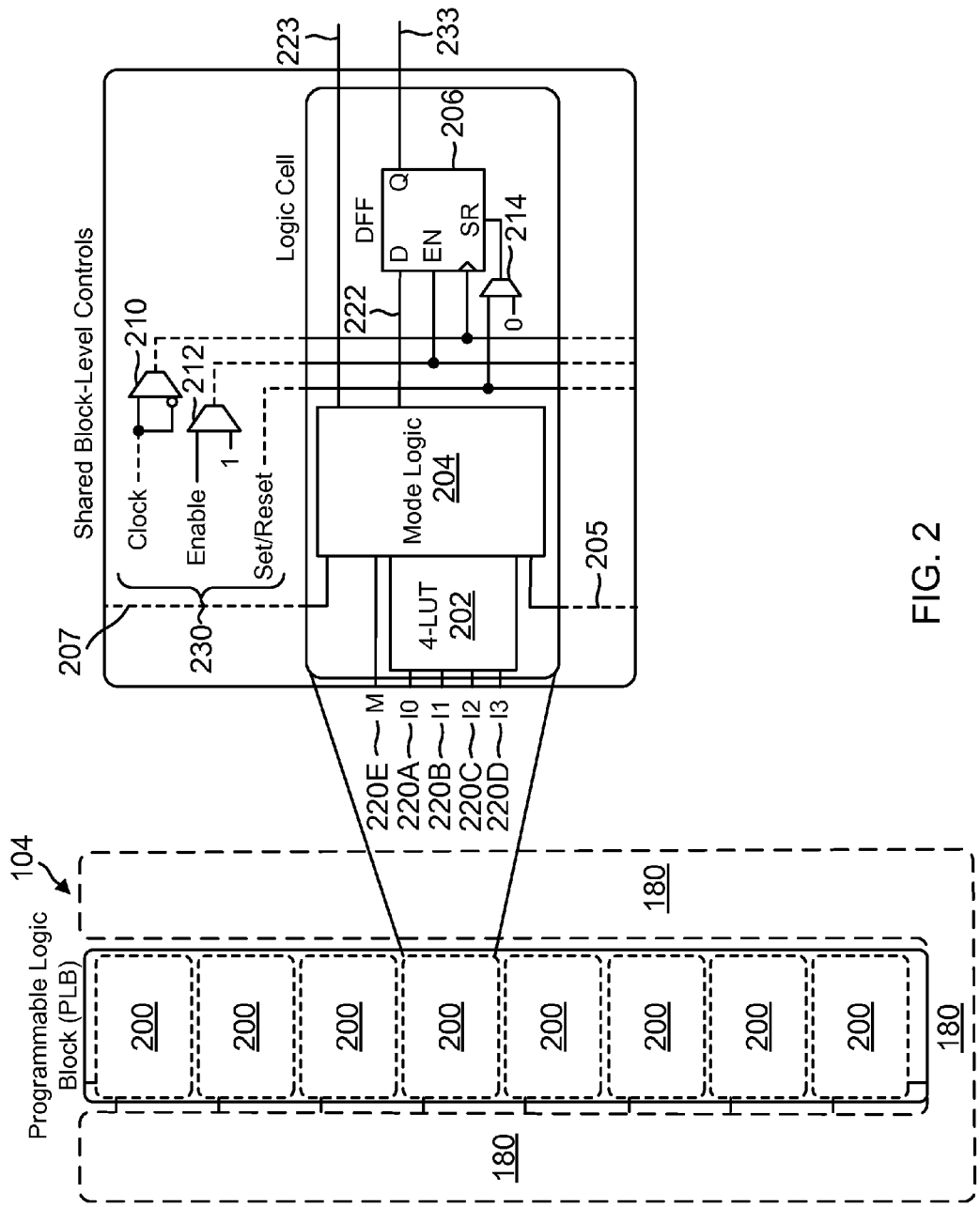
FIG. 2 illustrates a block diagram of a logic block for a PLD in accordance with an embodiment of the disclosure.

FIG. 2 illustrates a block diagram of a logic block 104 of PLD 100 in accordance with an embodiment of the disclosure. As discussed, PLD 100 includes a plurality of logic blocks 104 including various components to provide logic and arithmetic functionality, which can also be used to implement clock signal processing and/or functionality (e.g., a clock, a clock divider, a clock signal delay, a clock signal propagator, and/or other clock signal processing and/or functionality).

In the example embodiment shown in FIG. 2, logic block 104 includes a plurality of logic cells 200, which may be interconnected internally within logic block 104 and/or externally using routing resources 180. For example, each logic cell 200 may include various components such as: a lookup table (LUT) 202, a mode logic circuit 204, a register 206 (e.g., a flip-flop or latch), and various programmable multiplexers (e.g., programmable multiplexers 212 and 214) for selecting desired signal paths for logic cell 200 and/or between logic cells 200. In this example, LUT 202 accepts four inputs 220A-220D, which makes it a four-input LUT (which may be abbreviated as "4-LUT" or "LUT4") that can be programmed by configuration data for PLD 100 to implement any appropriate logic operation having four inputs or less. Mode logic 204 may include various logic elements and/or additional inputs, such as input 220E, to support the functionality of various modes for logic cell 200 (e.g., including various clock signal processing and/or functionality modes). LUT 202 in other examples may be of any other suitable size having any other suitable number of inputs for a particular implementation of a PLD. In some embodiments, different size LUTs may be provided for different logic blocks 104 and/or different logic cells 200.

An output signal 222 from LUT 202 and/or mode logic 204 may in some embodiments be passed through register 206 to provide an output signal 233 of logic cell 200. In various embodiments, an output signal 223 from LUT 202 and/or mode logic 204 may be passed to output 223 directly, as shown. Depending on the configuration of multiplexers 210-214 and/or mode logic 204, output signal 222 may be temporarily stored (e.g., latched) in latch 206 according to control signals 230. In some embodiments, configuration data for PLD 100 may configure output 223 and/or 233 of logic cell 200 to be provided as one or more inputs of another logic cell 200 (e.g., in another logic block or the same logic block) in a staged or cascaded arrangement (e.g., comprising multiple levels) to configure logic and/or other operations that cannot be implemented in a single logic cell 200 (e.g., operations that have too many inputs to be implemented by a single LUT 202). Moreover, logic cells 200 may be implemented with multiple outputs and/or interconnections to facilitate selectable modes of operation, as described herein.

Mode logic circuit 204 may be utilized for some configurations of PLD 100 to efficiently implement arithmetic operations such as adders, subtractors, comparators, counters, or other operations, to efficiently form some extended logic operations (e.g., higher order LUTs, working on multiple bit data), to efficiently implement a relatively small RAM, and/or to allow for selection between logic, arithmetic, extended logic, and/or other selectable modes of operation. In this regard, mode logic circuits 204, across multiple logic cells 202, may be chained together to pass carry-in signals 205 and carry-out signals 207, and/or other signals (e.g., output signals 222) between adjacent logic cells 202, as described herein. In the example of FIG. 2, carry-in signal 205 may be passed directly to mode logic circuit 204, for example, or may be passed to mode logic circuit 204 by configuring one or more programmable multiplexers. In some embodiments, mode logic circuits 204 may be chained across multiple logic blocks 104.

Logic cell 200 illustrated in FIG. 2 is merely an example, and logic cells 200 according to different embodiments may include different combinations and arrangements of PLD components. Also, although FIG. 2 illustrates logic block 104 having eight logic cells 200, logic block 104 according to other embodiments may include fewer logic cells 200 or more logic cells 200. Each of the logic cells 200 of logic block 104 may be used to implement a portion of a user design implemented by PLD 100. In this regard, PLD 100 may include many logic blocks 104, each of which may include logic cells 200 and/or other components which are used to collectively implement the user design.

Figure 3:
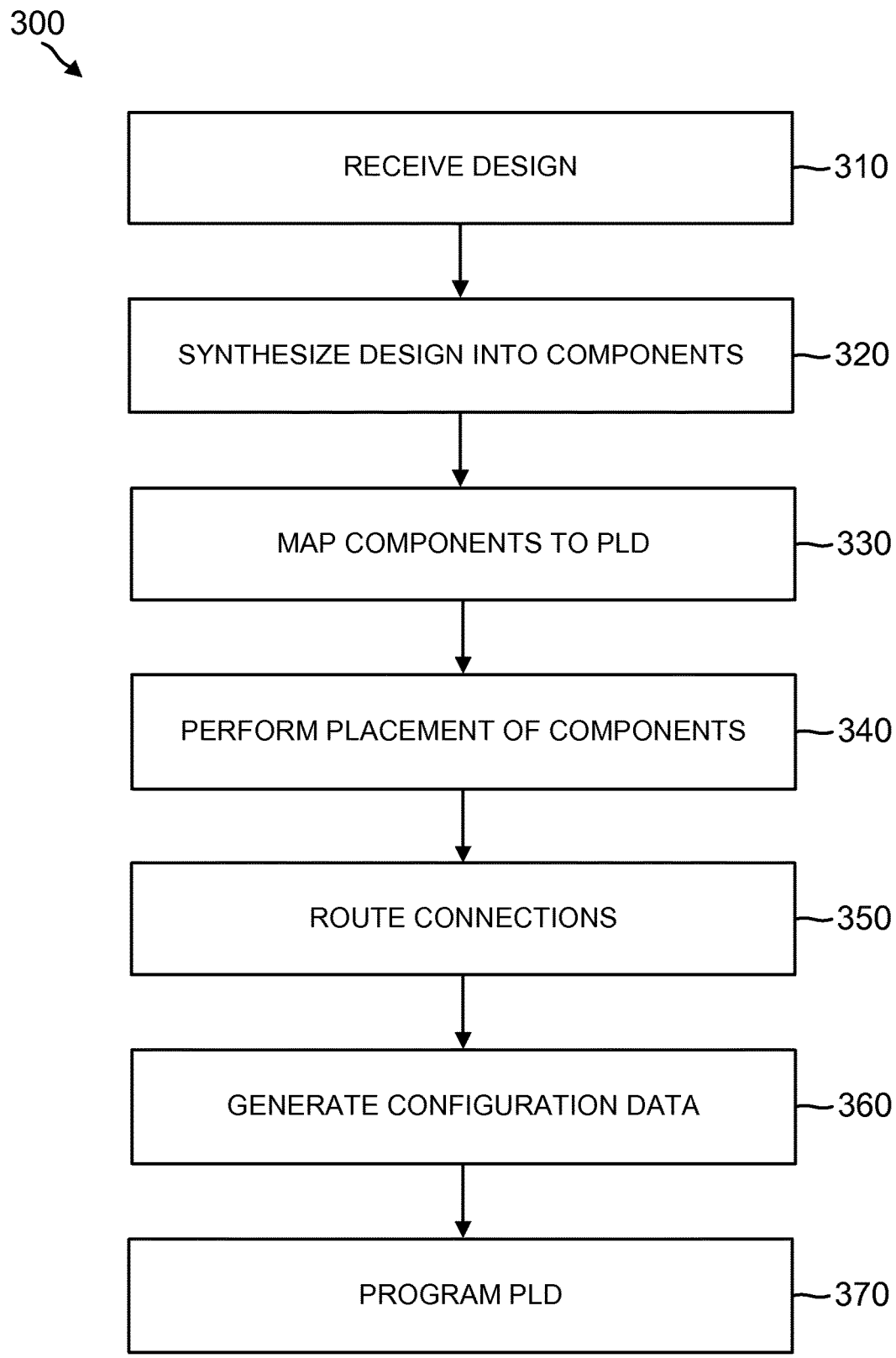
FIG. 3 illustrates a design process for a PLD in accordance with an embodiment of the disclosure.

FIG. 3 illustrates a design process 300 for a PLD in accordance with an embodiment of the disclosure. For example, the process of FIG. 3 may be performed by system 130 running Lattice Diamond software to configure PLD 100. In some embodiments, the various files and information referenced in FIG. 3 may be stored, for example, in one or more databases and/or other data structures in memory 134, machine readable medium 136, and/or otherwise.

In operation 310, system 130 receives a user design that specifies the desired functionality of PLD 100. For example, the user may interact with system 130 (e.g., through user input device 137 and hardware description language (HDL) code representing the design) to identify various features of the user design (e.g., high level logic operations, hardware configurations, and/or other features). In some embodiments, the user design may be provided in a register transfer level (RTL) description (e.g., a gate level description). System 130 may perform one or more rule checks to confirm that the user design describes a valid configuration of PLD 100. For example, system 130 may reject invalid configurations and/or request the user to provide new design information as appropriate.

In operation 320, system 130 synthesizes the design to create a netlist (e.g., a synthesized RTL description) identifying an abstract logic implementation of the user design as a plurality of logic components (e.g., also referred to as netlist components). In some embodiments, the netlist may be stored in Electronic Design Interchange Format (EDIF) in a Native Generic Database (NGD) file.

In some embodiments, synthesizing the design into a netlist in operation 320 may involve converting (e.g., translating) the high-level description of logic operations, hardware configurations, and/or other features in the user design into a set of PLD components (e.g., logic blocks 104, logic cells 200, and other components of PLD 100 configured for logic, arithmetic, or other hardware functions to implement the user design) and their associated interconnections or signals. Depending on embodiments, the converted user design may be represented as a netlist.

In some embodiments, synthesizing the design into a netlist in operation 320 may further involve performing an optimization process on the user design (e.g., the user design converted/translated into a set of PLD components and their associated interconnections or signals) to reduce propagation delays, consumption of PLD resources and routing resources, and/or otherwise optimize the performance of the PLD when configured to implement the user design. Depending on embodiments, the optimization process may be performed on a netlist representing the converted/translated user design. Depending on embodiments, the optimization process may represent the optimized user design in a netlist (e.g., to produce an optimized netlist).

In some embodiments, the optimization process may include optimizing routing connections identified in a user design. For example, the optimization process may include detecting connections with timing errors in the user design, and interchanging and/or adjusting PLD resources implementing the invalid connections and/or other connections to reduce the number of PLD components and/or routing resources used to implement the connections and/or to reduce the propagation delay associated with the connections.

In operation 330, system 130 performs a mapping process that identifies components of PLD 100 that may be used to implement the user design. In this regard, system 130 may map the optimized netlist (e.g., stored in operation 320 as a result of the optimization process) to various types of components provided by PLD 100 (e.g., logic blocks 104, logic cells 200, embedded hardware, and/or other portions of PLD 100) and their associated signals (e.g., in a logical fashion, but without yet specifying placement or routing). In some embodiments, the mapping may be performed on one or more previously-stored NGD files, with the mapping results stored as a physical design file (e.g., also referred to as an NCD file). In some embodiments, the mapping process may be performed as part of the synthesis process in operation 320 to produce a netlist that is mapped to PLD components.

In operation 340, system 130 performs a placement process to assign the mapped netlist components to particular physical components residing at specific physical locations of the PLD 100 (e.g., assigned to particular logic cells 200, logic blocks 104, clock-related circuitry 108, routing resources 180, and/or other physical components of PLD 100), and thus determine a layout for the PLD 100. In some embodiments, the placement may be performed in memory on data retrieved from one or more previously-stored NCD files, for example, and/or on one or more previously-stored NCD files, with the placement results stored (e.g., in memory 134 and/or machine readable medium 136) as another physical design file.

In operation 350, system 130 performs a routing process to route connections (e.g., using routing resources 180) among the components of PLD 100 based on the placement layout determined in operation 340 to realize the physical interconnections among the placed components. In some embodiments, the routing may be performed in memory on data retrieved from one or more previously-stored NCD files, for example, and/or on one or more previously-stored NCD files, with the routing results stored (e.g., in memory 134 and/or machine readable medium 136) as another physical design file.

In various embodiments, routing the connections in operation 350 may further involve performing an optimization process on the user design to reduce propagation delays, consumption of PLD resources and/or routing resources, and/or otherwise optimize the performance of the PLD when configured to implement the user design. The optimization process may in some embodiments be performed on a physical design file representing the converted/translated user design, and the optimization process may represent the optimized user design in the physical design file (e.g., to produce an optimized physical design file).

In some embodiments, the optimization process may include optimizing routing connections identified in a user design. For example, the optimization process may include detecting connections with timing errors in the user design, and interchanging and/or adjusting PLD resources implementing the invalid connections and/or other connections to reduce the number of PLD components and/or routing resources used to implement the connections and/or to reduce the propagation delay associated with the connections.

Changes in the routing may be propagated back to prior operations, such as synthesis, mapping, and/or placement, to further optimize various aspects of the user design.

Thus, following operation 350, one or more physical design files may be provided which specify the user design after it has been synthesized (e.g., converted and optimized), mapped, placed, and routed (e.g., further optimized) for PLD 100 (e.g., by combining the results of the corresponding previous operations). In operation 360, system 130 generates configuration data for the synthesized, mapped, placed, and routed user design. In operation 370, system 130 configures PLD 100 with the configuration data by, for example, loading a configuration data bitstream into PLD 100 over connection 140.

Timing-driven design optimization may be implemented by defining different characteristics of the timing of a design and operating to optimize those characteristics. For example, a timing path may be defined as a logic path or other type of connection between certain circuit endpoints (e.g., PLD components, and/or source and target nodes) that is subject to various types of timing constraints. One example of a timing path is a connection between registers clocked according to a specific frequency. Other examples include connections between multiple components along a bus structure that are configured to receive the same signal within a common timing delay, for example, and/or other interrelated connections involving clock signals, data paths, dedicated clock circuitry, and/or generic routing resources of a PLD, as described herein.

In general, there are two primary types of timing constraints: setup timing constraints and hold timing constraints. A setup timing constraint generally specifies the maximum allowable delay along a timing path in order for a design to work at a desired speed. By contrast, a hold timing constraint generally describes the minimum allowable delay value along a timing path to guarantee correct operation of the design (e.g., guaranteeing correct data transitions along a data path in the design, for example).

Along any timing path/connection, the difference between a desired delay and an actual delay may be defined as that connection's timing slack. If the timing slack of a connection is negative, a timing error has occurred and the routing of the design is not error-free. However, the timing slacks for different connections in a design can be interrelated, for example, and in some instances excess timing slack associated with one connection can be re-allocated to one or more interrelated connections to increase the timing slack in another connection and/or help produce a timing error-free design routing. Methods for distributing timing slacks for different but interrelated connections may be referred to as slack allocation.

Slack allocation was first introduced in placement operations to provide a maximum delay boundary for each connection in a design based on a corresponding timing delay estimation. Slack allocation (e.g., based on an initial routing result) has since been extended to routing operations and has been modified to cover both setup and hold timing constraints. As used herein, slack allocation may be defined as a process to distribute the timing slack along multiple interrelated connections in a design to the individual connections, and to compute minimum and maximum timing delay boundaries corresponding to a delay window [Dmin, Dmax] for each signal connection. Example slack allocation algorithms include the Zero Slack algorithm, the Iterative-Minimax-PERT algorithm, the Limit-Bumping algorithm, portions of the Routing Cost Valley algorithm, and/or other so-called long-path and/or short-path slack allocation algorithms. Once a delay window for a connection has been determined, the connection is routed or re-routed to have an actual timing delay within its delay window to produce a delay-specific routing for the connection and/or design.

Different types of timing constraints may be associated with timing paths, signals and/or signal connections, multiple interrelated connections/timing paths, and/or other particular circuit arrangements defined in a design. Some known examples of timing constraints associated most often with timing paths are: Tclock—a clock frequency requirement; Tsetup—a setup time required at an input with regard to a clock signal; and Tclock-to-out—a maximum clock-to-output delay at an output. Some known examples of timing constraints associated most often with signals and signal connections are: Tmaximum-delay—a maximum delay for a specific connection and/or any connections associated with a particular signal; Tmaximum-skew—a maximum delay difference between all connections associated with a signal and/or all connections associated with a set of signals defined in a bus structure (e.g., one signal distributed out to many targets).

In some embodiments, timing constraints can be associated with more than one connection and/or timing path. For example, Tsetup for a selection of register connections may be dependent upon both the individual timing delays of data connections to various register inputs and the timing delays of clock connections to clock pins of the corresponding registers. In embodiments where the timing delay along a particular data connection cannot be reduced, delay may be added to an associated clock connection in order to improve adherence to a Tsetup timing constraint for the corresponding selection of register connections. For example, for typical connections between registers, "useful skew" (e.g., also referred to as "cycle stealing" and/or "timing borrowing") may be used to improve both setup and/or hold timing by strategically inserting additional delay along, associated connections—adding delay to one connection can increase that connection's timing delay above a hold timing constraint and/or decrease a setup timing constraint dependent upon a difference between that connection's timing delay and another connection's (e.g., routed to the same register) timing delay.

In another example, clock signals may need to be routed using generic routing resources of a PLD. Each PLD has only a certain number of global clocks available for routing, but the pre-defined clock resources of the PLD (e.g., clock-related circuitry 108 of PLD 100) may not meet the demand for clock resources in a particular design. In such embodiments, some clock signals (e.g., typically chosen as less important clock signals with less stringent timing constraints) may be routed using generic routing resources of the PLD and/or in combination with the pre-defined clock resources of the PLD. In various embodiments, such routing benefits from characterizing and/or balancing the timing delay of clock signals routed using generic routing resources against clock signals routed using pre-defined clock resources (e.g., using useful skew techniques).

Many timing optimization problems can be solved by converting the various timing constraints on connections in a design to delay windows for the connections and routing the connections according to their respective delay windows to effect a delay-specific routing for the design. For example, to route connections implemented in a bus arrangement, routing such connections within a specific delay boundary common to all the connections of the bus can provide a solution adhering to a corresponding Tmaximum-skew constraint. In some embodiments, timing constraints related to multiple connections may be translated into setup and/or hold timing constraints (e.g., to form delay windows) for each individual connection. In various embodiments, delay-specific routing may be used to route or reroute connections and/or add useful skew to adhere to various corresponding delay windows, as described herein.

In addition, most individual PLDs are rated according to multiple different speed grades (e.g., based on throughput performance and/or clock frequency). For example, a fastest speed grade for a PLD may correspond to a verified, relatively high throughput performance and/or clock speed/frequency for the PLD at which a design will meet a particular hold timing constraint during operation. In general, a fastest speed grade for a PLD can be 2× or 3× faster than a typical or design speed grade for the PLD. In various embodiments, it may be desirable to implement a design in a PLD such that the PLD can be selectively operated at multiple different speed grades.

As noted herein, slack allocation may be used to determine the delay boundaries (e.g., the delay window) for each connection in a design, and in some embodiments these delay boundaries may be configured to accommodate one and/or multiple different speed grades. For example, in various embodiments, the minimum delay boundary may be determined based on hold timing constraints, and the maximum delay boundary may be determined based on setup timing constraints. In embodiments where there are multiple available speed grades for a PLD and/or circuit design, the design speed grade may be used to determine the setup timing constraints, and the fastest (or an intermediate) speed grade may be used to determine the hold timing constraints (e.g., using the more stringent or limiting speed grade for each timing constraint to enable operation at clock frequencies/throughputs corresponding to and/or bounded by the speed grades). Consequently, the resulting delay windows [Dmin, Dmax] may be relatively narrow in the context of PLD design and/or operation (e.g., narrower than 2 ns, narrower than 1 ns, or narrower than 0.1 ns, for example). Embodiments of the present disclosure may be configured to reliably route connections subject to relatively narrow delay windows, as described herein.

In various embodiments, routing connections in a design for a PLD includes a wave maze routing step where a waveform is expanded across an array of routing resource elements from a source component/node to define the path for the connection to a target component/node. In various embodiments, the expansion may be guided by various weights determined for each step of the waveform expansion that are selected to optimize an overall path distance, signal congestion, and/or other connection characteristics in the context of the design. In some embodiments, the weights may be determined to route the connection according to a particular timing delay and/or delay window. Conventional methods typically rely on a single wave expansion starting from the source component and estimations of the timing delay to the target component to route a connection, but, as noted herein, such estimations are increasingly inaccurate with respect to contemporary designs, and so substantial computing resources are wasted due to failed routings (e.g., routings that result in connections with timing delays outside their respective delay windows) and subsequent remedial procedures.

Figure 4:
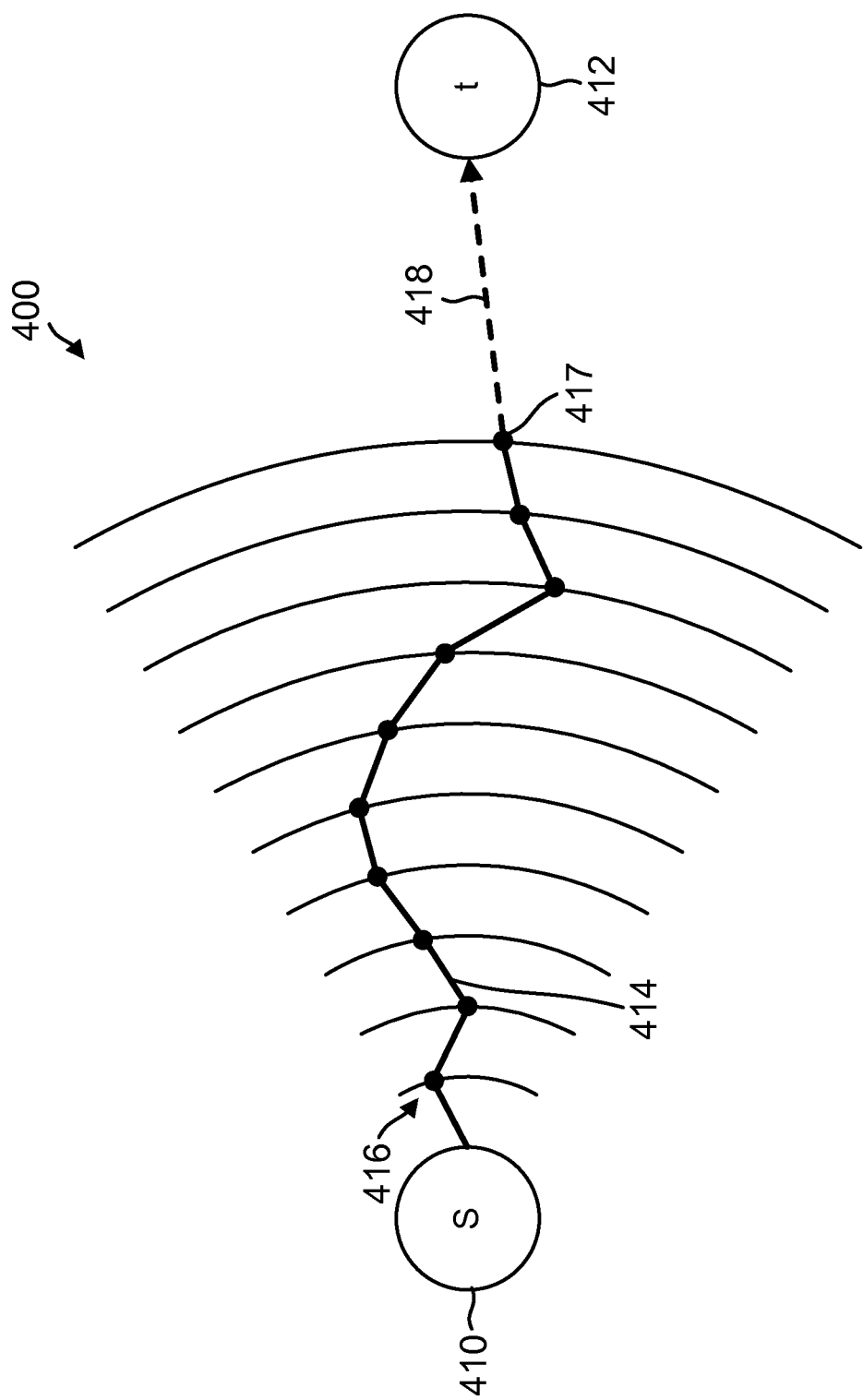
FIG. 4 illustrates a single wave maze routing process in accordance with an embodiment of the disclosure.

As an example, FIG. 4 illustrates a conventional single wave maze routing process in accordance with an embodiment of the disclosure. To route a connection according to a specified delay window [Drain, Dmax], conventional methods expand waveform 414 from source 410 toward target 412 in a routing graph 400 comprising an array of configurable routing resources 416. As shown in FIG. 4, the delay along waveform 414 from source 410 to routing resource 417 is known because each interstitial routing resource is known. However, the delay between routing resource 417 and target 412 along estimated waveform 418 is unknown, and that delay is conventionally estimated as the target cost associated with expanding waveform 414 substantially along estimated waveform 418. If the total delay (known and estimated) is outside the specified delay window, then the wave expansion shown in FIG. 4 is rejected and a partial or total ripup and reroute is implemented. However, if the total delay is within the specified delay window, the waveform expansion continues.

Because single wave expansion relies on estimating a substantial portion of the delay along the waveform expansion (e.g., corresponding to estimated waveform 418), the routing process often proceeds almost or fully to completion before a failed routing is detected and the connection is rerouted. Moreover, the weightings used to select the routing resources 416 closest to source 410 (e.g., the beginning of the single eave expansion) often don't change substantially after ripup caused by a routing failure detected near the completion of the routing corresponding to waveform 414, and so single wave expansions can miss a substantial number of potentially valid routings (e.g., waveform 414 may stay substantially the same while estimated waveform 418 is rerouted multiple times in an effort to meet a delay window requirement).

Figure 5:
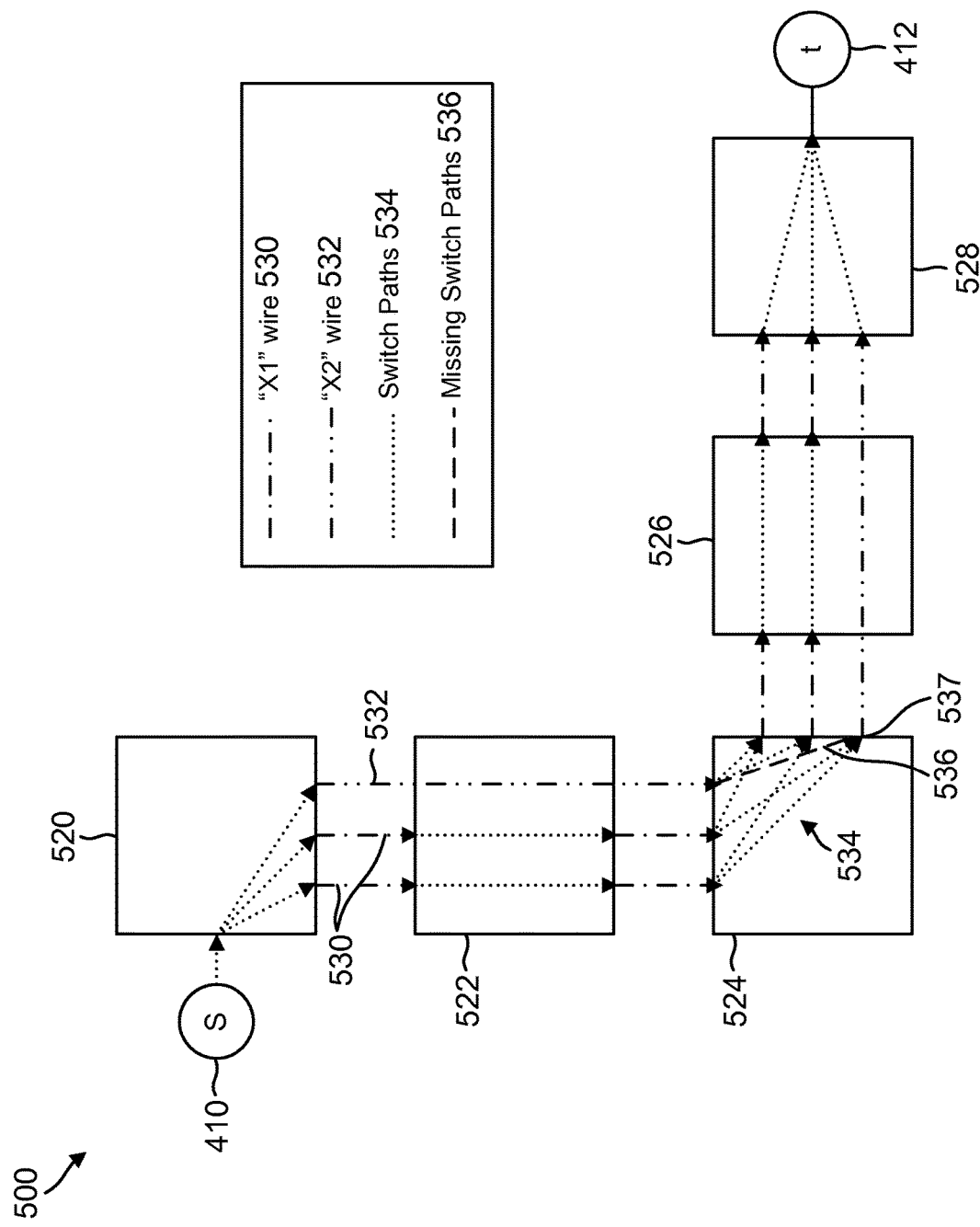
FIG. 5 illustrates a single wave maze routing process error in accordance with an embodiment of the disclosure.

FIGS. 5, 6, 7A, and 7B illustrate single wave maze routing process errors (e.g., that would render an estimated delay associated with estimated waveform 418 of FIG. 4 substantially inaccurate) that are particularly relevant with contemporary designs for PLDs. For example, FIG. 5 shows three connections (e.g., two X1 connections 530 and one X2 connection 532) that are to be routed between source 410 and target 412 along a selection of routing resources, such as distribution/collection nodes 520 and 528, conduit nodes 522 and 526, and switch node 524. As shown in switch node 524, contemporary switch nodes may not be implemented with full crossbar structures, and so each input of switch node 524 may only be able to couple to a limited number of outputs of switch node 524. In particular, FIG. 5 shows that X2 connection 532 cannot be routed to output 537 of switch node 524 because switch paths 524 of switch node 524 lacks "missing" switch path 537. Estimation techniques typically cannot account for such limitation when estimating a waveform expansion (e.g., estimated waveform 418), and so the estimated delay associated with a routing including switch box 524 would likely be inaccurate and result in relatively wasteful remedial rerouting operations.

Figure 6:
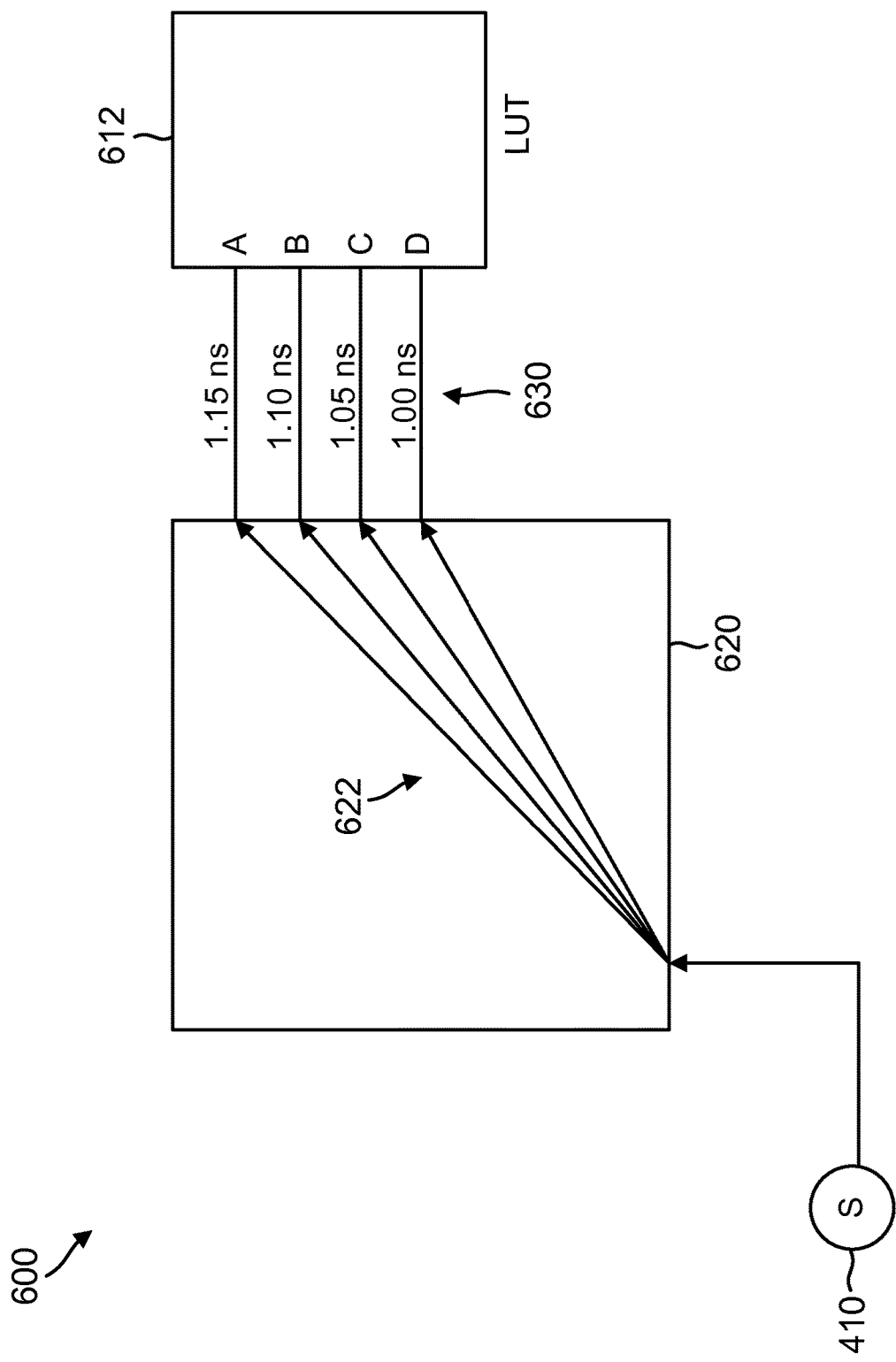
FIG. 6 illustrates a single wave maze routing process error in accordance with an embodiment of the disclosure.

In another example, FIG. 6 shows four connections 622 that are to be routed between source 410 and target 412 (e.g., 4-LUT 412) using a distribution node 620 to couple the four connections 622 to inputs A, B, C, D of 4-LUT 412. As shown in FIG. 6, although the four connection 622 are routed to 4-LUT 412 using the same routing resource (e.g., distribution node 620), the coupling within distribution node 620 and to inputs A, B, C, D of 4-LUT 412 results in different timing delays 630 for each input of 4-LUT 412, even though inputs A, B, C, D of 4-LUT 412 can be logic equivalent (e.g., they can be swapped by reprogramming 4-LUT 412). Estimation techniques typically cannot account for the different timing delays associated with each input, and so, particularly in the context of relatively narrow delay windows (e.g., approximately 0.15 ns, 0.1 ns, or 0.05 ns wide, for example), such as those associated with multiple speed grades for a PLD, the estimated delay associated with a routing including the arrangement shown in FIG. 6 would likely be inaccurate and result in relatively wasteful remedial rerouting operations.

In a further example, FIGS. 7A-B show a connection being routed between source 410 and target 412 using a single wave expansion along routing resources 416. As shown in FIGS. 7A-B, estimated waveform 418 is unable to account for congestion 720 (e.g., a number of different pre-routed connections utilizing most or all routing resources in the area corresponding to congestion 720). Estimation techniques typically cannot account for the additional delay associated with waveform portion 714 needed to route around congestion 720, and so the estimated delay associated with a routing being performed in a relatively congested design (e.g., such as near the completion of routing of the design) would likely be inaccurate and result in relatively wasteful remedial rerouting operations. Embodiments of the present disclosure are not subject to such problems because they replace estimations in the delay-specific routing process with full physical paths (e.g., and their associated actual timing delays) of connections between source and target components that are calculated using a dual wave maze routing process.

In various embodiments, a dual wave maze routing algorithm may be configured to provide a timing error-free delay-specific routing for a design. As an example, FIGS. 8A-B illustrate a dual wave maze routing process in accordance with an embodiment of the disclosure. In the embodiment shown in FIGS. 8A-B, two waveforms 414 and 814 are expanded from source 410 and target 412. In various embodiments, the dual waveform expansions may be performed substantially concurrently, and each waveform expansion may be configured to route to the current end point of the other (e.g., between end points 816, 818) to form a full path for the connection. As shown in FIG. 8B, when the two waveforms 414 and 814 meet at an intermediate routing resource (e.g., routing resource 840), the delay from source 410 to intermediate routing resource 840 is known (e.g., calculable), and the delay from intermediate routing resource 840 to target 412 is also known. If the resulting total timing delay is within the connection's corresponding delay window, a valid path has been found. Otherwise, the wave expansion continues until a valid path has been found, or until substantially all the routing space has been explored.

Because dual wave expansion determines (e.g., provides for the calculation of) the actual total timing delay, rather than relying on an estimate, the dual wave routing process typically detects and routes around timing impediments to valid routings relatively early in the overall routing process, which can, in some embodiments, reduce overall use of computing resources. Moreover, because dual wave expansion employs two wave expansions, one each at the source and target for the connection, the weightings used to select the routing resources 416 closest to source 410 and target 412, for respective waveforms 414 and 814, are more likely to change during the dual wave maze routing process (e.g., relative to a single wave maze routing process). Therefore, dual wave expansions typically search relatively more (e.g., substantially all) potentially valid routings between source 410 and target 412, which often allows routing processes utilizing dual wave expansions to find full valid routings for a design even when the timing constraints are relatively stringent (e.g., corresponding delay windows are relatively narrow).

Figure 9:
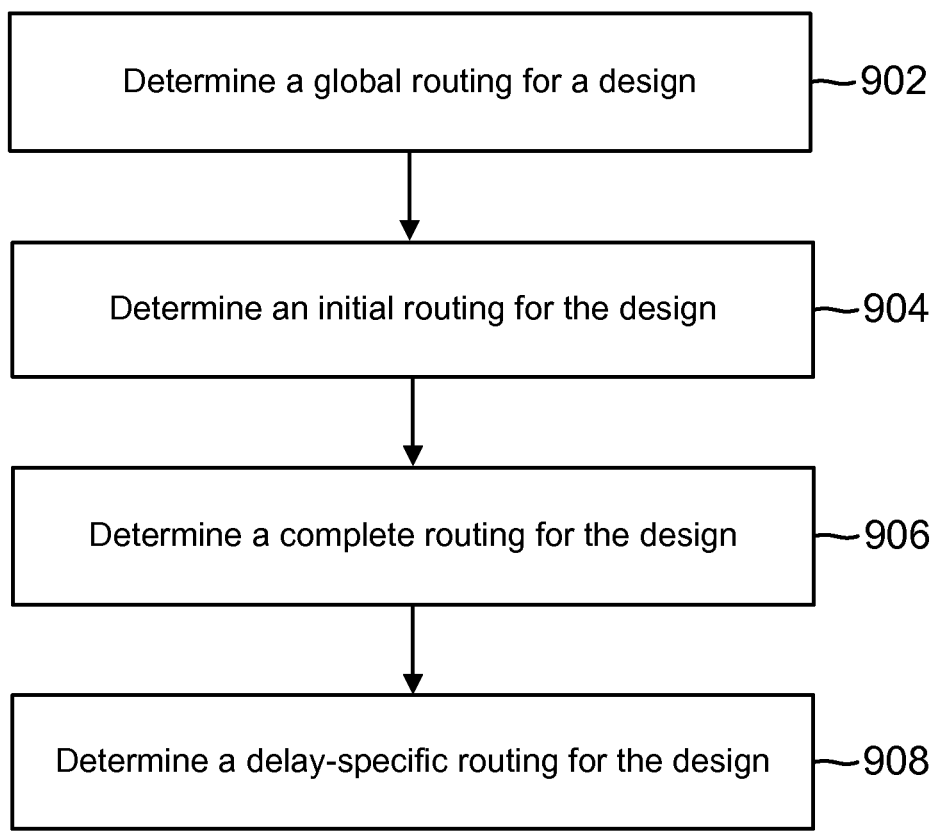
FIG. 9 illustrates a design process for a PLD in accordance with an embodiment of the disclosure.

FIG. 9 illustrates design process 350 for a PLD in accordance with an embodiment of the disclosure. For example, the process of FIG. 9 may be performed by system 130 running Lattice Diamond software to configure PLD 100, as discussed with respect to FIG. 3. More specifically, FIG. 9 illustrates an embodiment of the present disclosure where operation 350 of FIG. 3 is expanded into operations 902, 904, 906, and 908 representing an negotiation based routing process, as described herein. In various embodiments, any one or more of operations 902, 904, 906, and 908 may be omitted from process 350.

In operation 902, system 130 determines a global routing for a design. For example, system 130 may be configured to detect global clock signals/resources and/or other device specific and/or specialized resources (e.g., SERDES blocks, and/or other device specific and/or specialized resources of a PLD) in a design for PLD 100 and route connections between the detected clock and/or device specific resources prior to routing connections between other components for the design. In various embodiments, connections for clock and/or specialized (e.g., limited) resources may be routed as group before other PLD components in a design in order to ensure they are routed with the highest priority with respect to timing constraints, available resources, and/or other characteristics of a design and/or PLD.

In some embodiments, routing connections between the global clock resources may take precedence over routing connections between other components in order to validate the design with respect to global clock resources of a particular PLD (e.g., PLD 100) and/or optimize routing of the global clock resource connections without inefficiencies caused by prior routings of other connections (e.g., corresponding to other components) in the design. In some embodiments, the routing processes used to route connections between global clock resources may be specifically tailored to such routing, for example, and other routing processes may be used to route connections among other components of the user design.

In operation 904, system 130 determines an initial routing for a design. For example, system 130 may be configured to route many or all connections within a design (e.g., the connections remaining after the global routing performed in operation 902) with relatively small penalty for resource sharing (e.g., where multiple connections are routed using at least a portion of common routing resources) in order to produce a natural or base timing and congestion estimation for the design. In some embodiments, such initial routing may be performed as a single wave expansion maze routing, as described herein. In some embodiments, the penalty or weighting against connections using common routing resources, in an initial routing, may increase as the number of connections using the common routing resources increases. In other embodiments, the weighting against connections using common routing resources, in an initial routing, may be substantially the same as the number of connections using the common routing resources increases.

In various embodiments, such initial routing may allow or disallow sharing of resources previously routed in operation 902.

In operation 906, system 130 determines a complete routing for a design. For example, system 130 may be configured to iteratively adjust the initial routing provided in operation 904 to eliminate any resource conflicts (e.g., shared resources). In some embodiments, negotiation-based routing techniques may be used to route multiple connections sharing routing resources, and resource conflicts among the commonly-routed connections may be resolved based on priorities or weightings associated with the connections. For example, the priorities and/or weightings associated with the connections may be based on timing constraints, congestion conditions, speed grades, and/or other connection characteristics specified in the design and/or associated with the PLD. In various embodiments, negotiation-based routing techniques may be connection-based (e.g., where different connections are routed one at a time) or signal-based (e.g., where signals are routed one at a time, with each signal having one or more associated connections that are routed before additional signals are routed).

In operation 908, system 130 determines a delay-specific routing for a design. For example, system 130 may be configured to determine delay windows for connections in the global routing provided by operation 902, the initial routing provided by operation 904, and/or the complete routing provided by operation 906, to identify invalid connections in the routing(s) (e.g., based on the corresponding delay windows), and to route the invalid connections (e.g., the connections with timing delays outside or near the bounds of their delay windows) using a dual wave maze routing process to provide a delay-specific routing for the design, as described herein. Additional detail with regard to operation 908 is provided in the discussion of FIG. 10.

Figure 10:
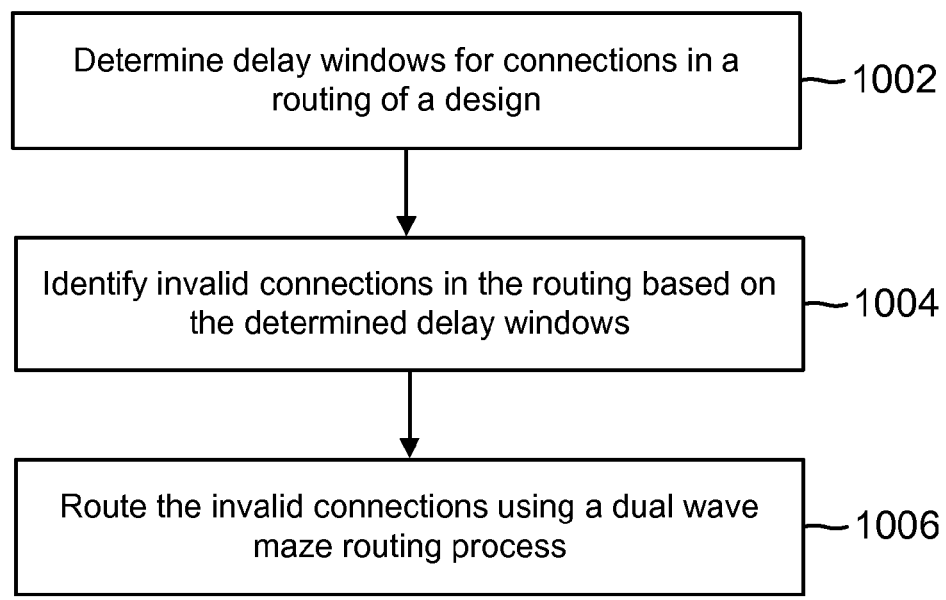
FIG. 10 illustrates a design process for a PLD in accordance with an embodiment of the disclosure.

FIG. 10 illustrates design process 908 for a PLD in accordance with an embodiment of the disclosure. For example, the process of FIG. 10 may be performed by system 130 running Lattice Diamond software to configure PLD 100, as discussed with respect to FIGS. 3 and 9. More specifically, FIG. 10 illustrates an embodiment of the present disclosure where operation 908 of FIG. 9 is expanded into operations 1002, 1004, and 1006 representing a delay-specific routing process, as described herein.

In operation 1002, system 130 determines delay windows for connections in a routing of a design to be implemented in a PLD. For example, system 130 may be configured to perform slack allocation with respect to setup and hold timing constraints for the connections in the global routing provided by operation 902, the initial routing provided by operation 904, and/or the complete routing provided by operation 906, as described herein. In various embodiments, the global, initial, and/or complete routing may be performed before slack allocation in order to reduce and/or minimize reliance on estimates of timing slack when performing slack allocation. As described herein, slack allocation may be used to distribute the slack (e.g., including negative slack) among interrelated connections between PLD components identified in a design for a PLD. Slack allocation may be performed for both setup and hold timing constraints of a design to produce a delay window for each connection in the design.

Several different types of timing constraints can be converted to delay windows for connections in a design. For example, a delay window [Dmin, Dmax] may be determined via slack allocation according to setup and hold timing corresponding to a single speed grade, for instance, or two or multiple different speed grades (e.g., SPhold and SPsetup), so as to ensure operation of a design for a PLD across a range of performance settings (e.g., throughputs and/or clock speeds). The minimum delay boundary Dmin may be determined as a hold timing constraint based on a first speed grade SPhold, and the maximum delay boundary may be determined as a setup timing constraint based on a second speed grade SPsetup. As noted herein, for a particular PLD, the delay value associated with the second speed grade SPsetup (e.g., a design speed grade) may be approximately 2× or 3× larger than the delay value associated with the first speed grade SPhold (e.g., a fastest speed grade). As a result, the resulting delay window can be relatively narrow.

In another example, a design may include a bus structure and a Tmaximum-skew timing constraint for all connections and/or the signals associated with the bus structure. As described herein, Tmaximum-skew may refer to the maximum delay difference (or skew) among all the connections/signals defined in the bus structure. In various embodiments, Tmaximum-skew for a bus structure may be converted into delay windows for each connection in the bus structure by determining the timing delays for each connection from the routing (e.g., global, initial, complete) of the design, setting Dmax for each delay window approximately equal to the longest timing delay of the bus structure, and determining Dmin for each delay window from corresponding hold timing constraints for each connection.

For instance, in some embodiments, a PLD may include a limited number of various pre-defined global clock resources. In such embodiments, a corresponding design may define more clock signals than available global clock resources in the PLD. As a result, some clock signals in the design may need to be routed using generic routing resources of the PLD. In some embodiments, to provide a balanced routing for the clock signals in the design (e.g., routed by both global clock resources and generic routing resources), the two different types of resources may be combined into a clock bus structure, and a corresponding Tmaximum-skew may be used to determine each constituent connection's delay window [Drain, Dmax], as described herein.

Another example involves Tclock-to-output, as described herein. In various embodiments, Tclock-to-output may define a timing constraint associated with a clock connection, a data connection to a primary output, and a reference clock connection to another primary output. In practice, several different Tclock-to-output timing constraint structures can share the same reference clock, such as in a bus structure with respect to the reference clock signal. In various embodiments, Tclock-to-output timing constraints may be converted into delay windows by grouping corresponding structures sharing a reference clock, determining, for each group, an effective Tmaximum-skew for the reference clock connections based, at least in part, on the corresponding Tclock-to-output timing constraints, using the effective Tmaximum-skew to determine delay windows for the corresponding reference clock connections, and then determining delay windows for the remaining connections in each Tclock-to-output timing constraint structure based on that structure's reference clock connection delay window and the corresponding Tclock-to-output timing constraint.

In operation 1004, system 130 identifies invalid connections in a routing based on determined delay windows. For example, system 130 may be configured to determine timing delays for the connections with delay windows determined in operation 1002, compare the timing delays with their corresponding delay windows, and identify the invalid connections as those connections with timing delays outside their corresponding delay windows and/or on minimum and maximum timing delay boundaries of their corresponding delay windows. In some embodiments, system 130 may be configured to identify the invalid connections as connections in the routing with timing delays within one or more predetermined delay times of minimum and maximum timing delay boundaries of the corresponding delay windows.

For example, system 130 may be configured to identify a connection as invalid if its timing delay is within 10% of the width of its delay window from either of its minimum and maximum timing delay boundaries. In other embodiments, the predetermined delay times may be an integer number of clock time periods, for example, and/or a set time, such as 0.1, 0.05, and/or 0.001 ns. Such predetermined delay times may be selected by a user, for example, and/or may be determined based on a speed grade or speed grade range for the design. In various embodiments, system 130 may be configured to determine each connection's timing delay by analyzing that connection's routing on a PLD (e.g., PLD 100). For example, each routing resource in a PLD may have a characteristic timing delay associated with it, and a connection routed through multiple such routing resources may have a timing delay approximately equal to the sum of the individual timing delays of its constituent routing resources. In some embodiments, the timing delays for the connections may be determined in operation 1002, for example, and/or as part of performing slack allocation on the connections in a design.

In operation 1006, system 130 routes invalid connections using a dual wave maze routing process. For example, system 130 may be configured to route invalid connections identified in operation 1004 using a dual wave maze routing process, as described herein, to provide a delay-specific routing for the design. In some embodiments, system 130 may be configured to re-route (e.g., ripup and route) valid connections (e.g., connections not identified as invalid) using a single wave maze routing process, for example, to allow invalid connections to be routed. In other embodiments, all re-routing may be performed using a dual eave maze routing process. In various embodiments, system 130 may be configured to route the invalid connections to provide a timing error-free delay-specific routing for the design, where the timing delay for each connection in the design is approximately within that connection's delay window. In some embodiments, operation 1006 may be an iterative routing optimization process, for example, where multiple iterations may be required.

In various embodiments, the dual wave routing process may include, for each invalid connection identified in operation 1004, identifying source and target components for the invalid connection, determining source and target maze expansion waves at the source and target components, and routing the invalid connection according to the determined source and target maze expansion waves. FIGS. 8A-B illustrate such a dual wave routing process. In some embodiments, system 130 may be configured to detect a resulting timing delay (e.g., corresponding to a partial or completely routed connection) is outside the specified delay window [Drain, Dmax] and continue the wave expansion and/or re-route the connection using the dual wave routing process until a routing has been found to meet the specified delay window.

In some embodiments, routing invalid and/or valid connections may include adding additional delay to connections (e.g., applying the technique of useful skew), which can be applied to improve either or both setup and hold timing constraints. For example, useful skew may be used to improve timing delays with respect to clock signals routed within generic routing resources and/or global clock routing resources. In some embodiments, extra delay can be added to clock connections to registers without negatively affecting overall global clock quality.

Thus, embodiments of the present disclosure provide a solution for delay-specific routing of complex designs for PLDs. Moreover, embodiments of the present methods can route connections with relatively stringent timing requirements efficiently by using a dual wave maze routing process to determine the actual delay of the routings as the waveforms are expanded. Various experimental results illustrate some of the advantages of implementations of the disclosed methods.

One example experimental result is shown in Table 1. In Table 1, "Wslack" indicates the worst slack for setup/hold timing analysis under the corresponding speed grade (e.g., setup and/or hold), "Tscore" indicates the total timing score similar to total negative slack (TNS) mentioned in related publications, and CPU is the CPU runtime measured in seconds.

for all test designs subject to delay windows with widths greater than or equal to approximately 0.25 ns, and found valid routings for at least some test designs even when subject to delay windows with approximately 0.0625 ns widths.

Figure 11:
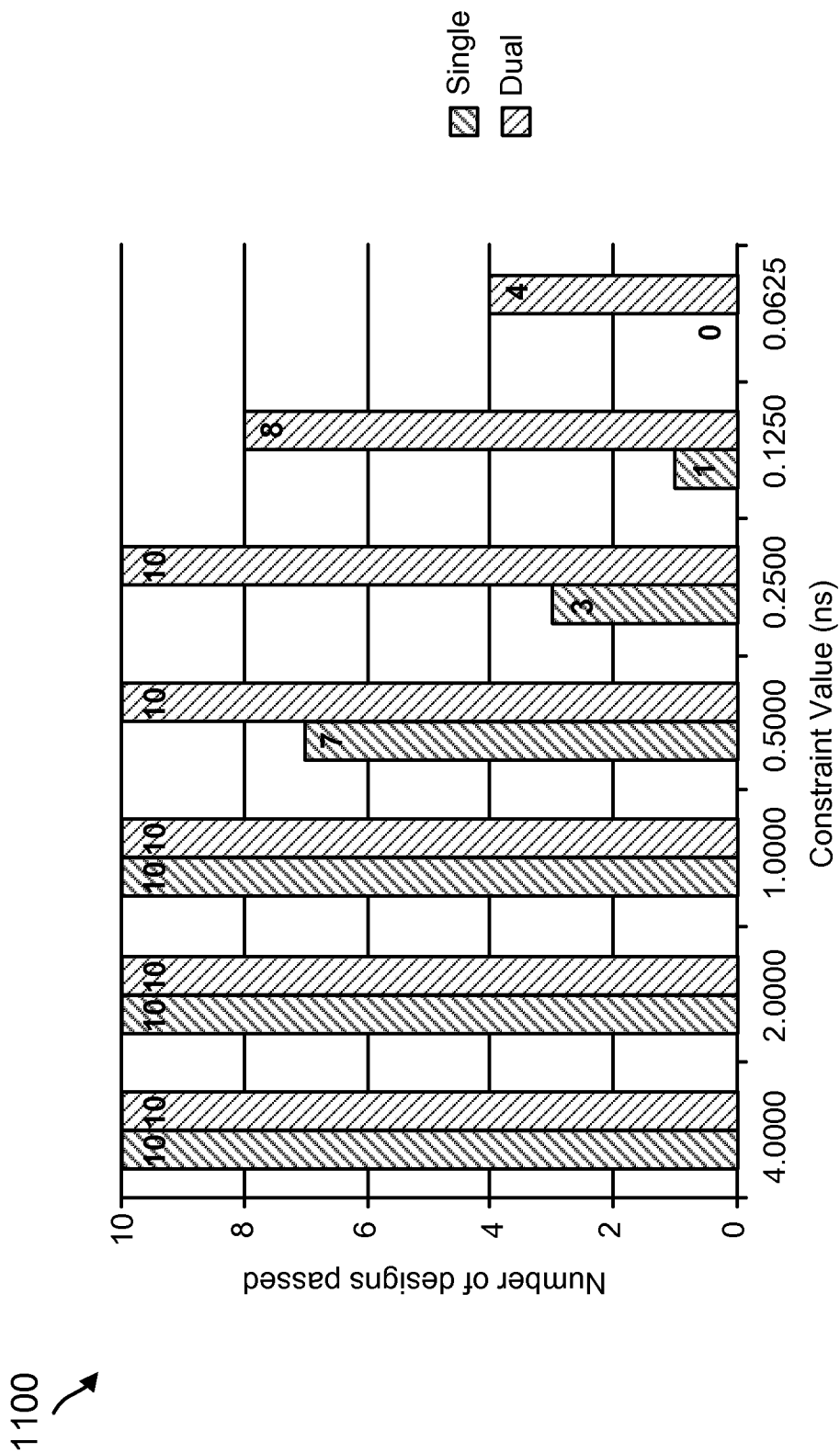
FIG. 11 illustrates a graph of successful routing completions as a function of timing constraint for single and dual wave maze routing processes in accordance with an embodiment of the disclosure.
Figure 12:
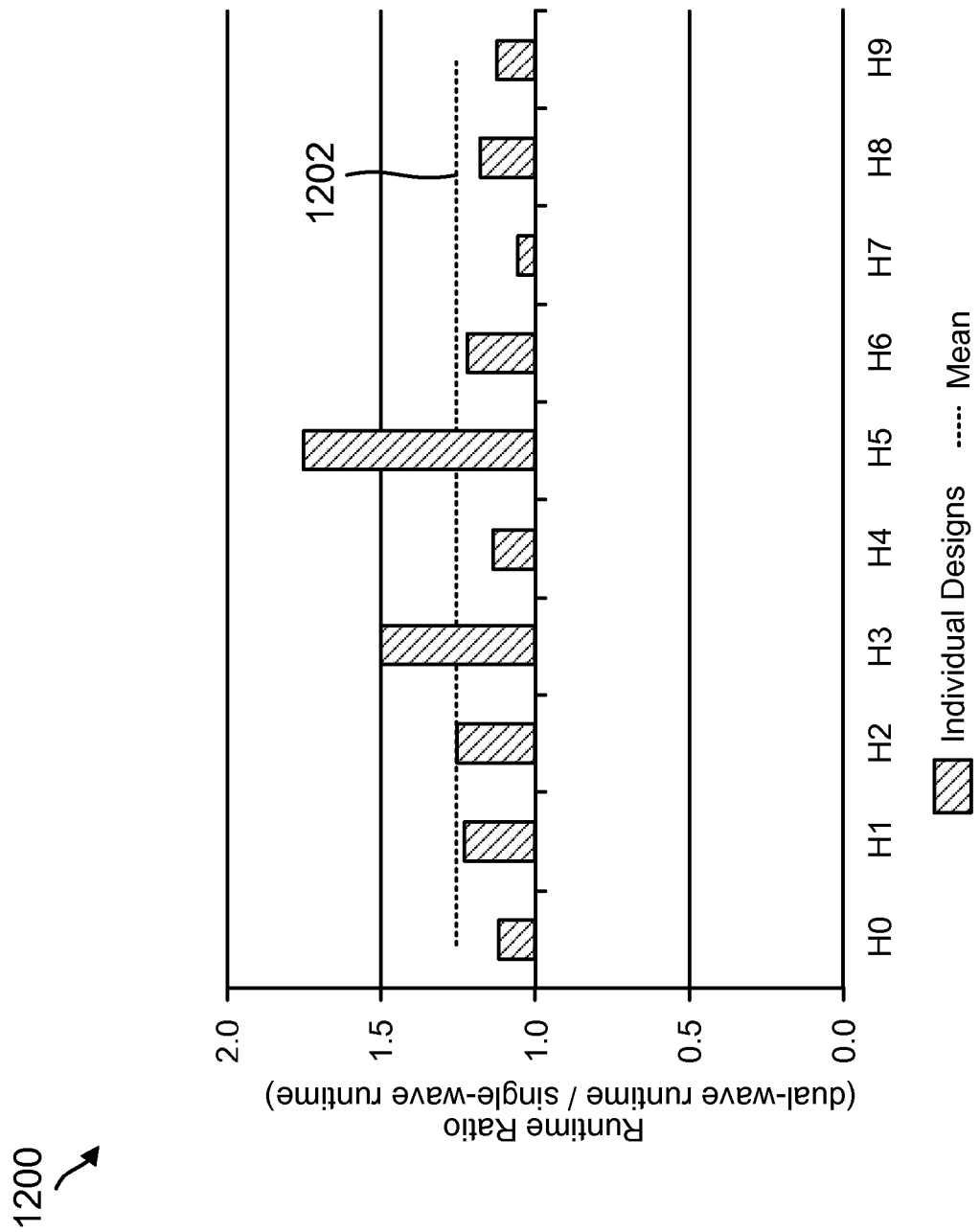
FIG. 12 illustrates a graph of relative CPU runtime performance for single and dual wave maze routing processes in accordance with an embodiment of the disclosure.

FIG. 12 illustrates a graph 1200 of relative CPU runtime performance for the single and dual wave maze routing processes used to generate the results in FIG. 11, in accordance with an embodiment of the disclosure. As can be seen from FIG. 12, and roughly corroborated in Table 1, the mean 1202 of the runtime ratio over the test designs (e.g., with timing constraints sufficiently large to allow valid routings to be determined using both single wave and dual wave routing processes) was approximately 1.21. This experimental result estimates, for one embodiment of the present disclosure, the approximate increase in overall CPU runtime needed to benefit from a dual wave routing process (e.g., to increase a chance of finding valid routings for a design) as timing constraints become more stringent, as described herein.

Where applicable, various embodiments provided by the present disclosure can be implemented using hardware,

TABLE 1

| | Old - Single Wave | | | | | New - Dual Wave | | | | | |
|---|---|---|---|---|---|---|---|---|---|---|---|
| | SETUP | | HOLD | | | SETUP | | HOLD | | | |
| Test | Wslack | Tscore | Wslack | Tscore | CPU | Wslack | Tscore | Wslack | Tscore | CPU | CPU Diff |
| t1 | −1.503 | 13.775 | −0.298 | 23.796 | 121 | −0.533 | 1.704 | 0.009 | 0.000 | 126 | 4.13% |
| t2 | −1.455 | 7.730 | −0.295 | 28.187 | 112 | −1.461 | 31.015 | 0.011 | 0.000 | 128 | 14.29% |
| t3 | −7.058 | 108.040 | −0.291 | 0.291 | 36 | −3.967 | 63.485 | 0.012 | 0.000 | 50 | 38.89% |
| t4 | −2.507 | 71.945 | 0.000 | 0.000 | 1965 | −2.455 | 35.674 | 0.007 | 0.000 | 2329 | 18.52% |
| t5 | −2.058 | 7.418 | 0.000 | 0.000 | 5799 | −2.058 | 7.399 | 0.009 | 0.000 | 6520 | 12.43% |
| t6 | −0.061 | 0.061 | 0.000 | 0.000 | 6601 | −0.159 | 0.309 | 0.010 | 0.000 | 6964 | 5.50% |
| t7 | −0.896 | 10.134 | 0.000 | 0.000 | 1849 | −0.896 | 10.822 | 0.010 | 0.000 | 2344 | 26.77% |
| t8 | −1.704 | 36.232 | 0.000 | 0.000 | 4002 | −2.360 | 13.161 | 0.010 | 0.000 | 4491 | 12.22% |
| t9 | 0.320 | 0.000 | 0.002 | 0.000 | 205 | 0.320 | 0.000 | 0.011 | 0.000 | 367 | 79.02% |
| t10 | −5.015 | 393.997 | 0.002 | 0.000 | 64 | −5.030 | 390.518 | 0.017 | 0.000 | 79 | 23.44% |
| t11 | −0.059 | 0.120 | 0.004 | 0.000 | 1339 | −0.059 | 0.118 | 0.027 | 0.000 | 1610 | 20.24% |
| t12 | −0.727 | 10.446 | 0.008 | 0.000 | 455 | −2.160 | 46.772 | 0.010 | 0.000 | 530 | 16.48% |
| t13 | −2.848 | 103.815 | 0.011 | 0.000 | 57 | −3.061 | 103.805 | 0.018 | 0.000 | 73 | 28.07% |
| t14 | 3.272 | 0.000 | 0.333 | 0.000 | 55 | 3.272 | 0.000 | 0.333 | 0.000 | 56 | 1.82% |

From Table 1, it can be seen that an embodiment of the present disclosure corrected all hold timing errors in the selected test designs, while a conventional method failed to correct three hold timing errors and resulted in three failed routings with no viable solutions. Also, while the CPU time utilized by the experimental embodiment was approximately 21% longer by average, that increase was primarily due to the additional processing corresponding to timing delay updates and slack allocation, which were not performed in the conventional method and can be optimized further and/or separately from the rest of the dual wave delay-specific routing process.

Other example experimental results are illustrated in FIGS. 11 and 12. FIG. 11 illustrates a graph 1100 of successful routing completions as a function of timing constraint for single and dual wave maze routing processes in accordance with an embodiment of the disclosure. As can be seen from FIG. 11, as the timing constraints were made more stringent (e.g., the corresponding timing windows were made narrower), the single wave routing process found fewer and fewer valid routings for the ten test designs and eventually failed to find any routing for any of the test designs. By contrast, the dual wave routing process (e.g., an embodiment of the present disclosure) found valid routings software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

I claim:

1. A computer-implemented method comprising:
    determining delay windows for connections in a routing of a design for a programmable logic device (PLD);
    identifying invalid connections in the routing based, at least in part, on the determined delay windows; and
    routing the invalid connections using a dual wave maze routing process to provide a delay-specific routing for the design, wherein routing the invalid connections comprises re-routing valid connections in the routing using a single wave maze routing process to allow the invalid connections to be routed; and the routing of the invalid connections provides a timing error-free delay-specific routing for the design.

2. The computer-implemented method for claim 1, wherein the determining the delay windows comprises: performing slack allocation with respect to setup and hold timing constraints for the connections in the routing of the design.

3. The computer-implemented method of claim 2, wherein:
    the set-up and hold timing constraints are determined based, at least in part, on a single speed grade for the PLD or multiple different speed grades for the PLD.

4. The computer-implemented method of claim 1, wherein: the routing of the design comprises a complete routing for the design.

5. The computer-implemented method of claim 1, wherein the identifying the invalid connections comprises: determining timing delays with corresponding delay windows for the connections in the routing; and comparing the timing delays with corresponding delay windows for the connections in the routing; and identifying the invalid connections as connections in the routing with timing delays outside the corresponding delay windows and/or on minimum and maximum timing delay boundaries of the corresponding delay windows.

6. The computer-implemented method of claim 1, wherein the identifying the invalid connections comprises:
    determining timing delays for the connections in the routing;
    comparing the timing delays with corresponding delay windows for the connections in the routing; and
    identifying the invalid connections as connections in the routing with timing delays within one or more predetermined delay times of minimum and maximum timing delay boundaries of the corresponding delay windows.

7. A computer-implemented method comprising:
    determining delay windows for connections in a routing of a design for a programmable logic device (PLD);
    identifying invalid connections in the routing based, at least in part, on the determined delay windows; and
routing the invalid connections using a dual wave maze routing process to provide a delay-specific routing for the design wherein the dual wave maze routing process comprises, for each invalid connection in the design:
    identifying source and target components for the invalid connection;
    determining source and target maze expansion waves at the source and target components; and
    routing the invalid connection according to the determined source and target maze expansion waves.

8. The computer-implemented method of claim 1, further comprising:
    receiving the design; and synthesizing the design into a plurality of PLD components prior to routing the invalid connections.

9. The computer-implemented method of claim 1, further comprising:
    generating configuration data to configure physical components of the PLD in accordance with the delay-specific routing for the design; and
    programming the PLD with the configuration data.

10. A non-transitory machine-readable medium storing configuration data comprising the delay-specific routing provided by the method of claim 1.

11. A PLD comprising configuration data comprising the delay-specific routing provided by the method of claim 1.

12. A system comprising:
    a processor; and
    a memory adapted to store a plurality of computer readable instructions which when executed by the processor are adapted to cause the system to perform a computer-implemented method comprising:
        determining delay windows for connections in a routing of a design for a programmable logic device (PLD);
        identifying invalid connections in the routing based, at least in part, on the determined delay windows; and
        routing the invalid connections using a dual wave maze routing process to provide a delay-specific routing for the design, wherein the routing the invalid connections comprises: re-routing valid connections in the routing using a single wave maze routing process to allow the invalid connections to be routed; and the routing the invalid connections provides a timing error-free delay-specific routing for the design.

13. The system of claim 12, wherein determining the delay windows comprises: performing slack allocation with respect to setup and hold timing constraints for the connections in the routing of the design.

14. The system of claim 13, wherein: the setup and hold timing constraints are determined based, at least in part, on a single speed grade for the PLD or multiple different speed grades for the PLD.

15. The system of claim 12, wherein the identifying the invalid connections comprises:
    determining timing delays for the connections in the routing;
    comparing the timing delays with corresponding delay windows for the connections in the routing; and
    identifying the invalid connections as connections in the routing with timing delays outside the corresponding delay windows and/or on minimum and maximum timing delay boundaries of the corresponding delay windows.

16. The system of claim 12, wherein the identifying the invalid connections comprises:
    determining timing delays for the connections in the routing;
    comparing the timing delays with corresponding delay windows for the connections in the routing; and
    identifying the invalid connections as connections in the routing with timing delays within one or more predetermined delay times of minimum and maximum timing delay boundaries of the corresponding delay windows.

17. A system comprising:
    a processor; and a memory adapted to store a plurality of computer readable instructions which when executed by the processor are adapted to cause the system to perform a computer-implemented method comprising:

determining delay windows for connections in a routing of a design for a programmable logic device (PLD);

identifying invalid connections in the routing based, at least in part, on the determined delay windows; and routing the invalid connections using a dual wave maze routing process to provide a delay-specific routing for the design, wherein the dual wave maze routing process comprises, for each invalid connection in the design: identifying source and target components for the invalid connection;

determining source and target maze expansion waves at the source and target components; and routing the invalid connection according to the determined source and target maze expansion waves.

18. The system of claim 12, wherein the computer-implemented method further comprises: receiving the design; and synthesizing the design into a plurality of PLD components prior to routing the invalid connections.

19. The system of claim 12, wherein the computer-implemented method further comprises: generating configuration data to configure physical components of the PLD in accordance with the delay-specific routing for the design; and programming the PLD with the configuration data.

20. A non-transitory machine-readable medium storing a plurality of machine-readable instructions which when executed by one or more processors of a computer system are adapted to cause the computer system to perform a computer-implemented method comprising:

determining delay windows for connections in a routing of a design for a programmable logic device (PLD);

identifying invalid connections in the routing based, at least in part, on the determined delay windows; and routing the invalid connections using a dual wave maze routing process to provide a delay-specific routing for the design, wherein the dual wave maze routing process comprises, for each invalid connection in the design: identifying source and target components for the invalid connection; determining source and target maze expansion waves at the source and target components; and routing the invalid connection according to the determined source and target maze expansion waves.

* * * * *